United States Patent [19]

Christensen

[11] 4,000,664
[45] Jan. 4, 1977

[54] MECHANICAL ACTUATOR

[75] Inventor: John D. Christensen, Charlotte, N.C.

[73] Assignee: Duff-Norton Company, Inc., Charlotte, N.C.

[22] Filed: Sept. 8, 1975

[21] Appl. No.: 611,211

[52] U.S. Cl. .............................. 74/424.8 R; 74/467
[51] Int. Cl.² ..................... F16H 1/18; F16H 57/04
[58] Field of Search ............ 74/424.8 R, 467, 89.15

[56] References Cited

UNITED STATES PATENTS

| | | | |
|---|---|---|---|
| 2,660,027 | 11/1953 | Geyer | 74/424.8 X |
| 3,090,360 | 5/1963 | Bennett et al. | 74/424.8 R X |
| 3,135,497 | 6/1964 | Beck | 74/424.8 R X |
| 3,220,277 | 11/1965 | Dixon | 74/424.8 R |
| 3,371,551 | 3/1968 | Profet | 74/424.8 R |
| 3,483,765 | 12/1969 | Fornataro | 74/424.8 R X |
| 3,541,894 | 11/1970 | Mueller et al. | 74/424.8 R X |
| 3,585,868 | 6/1971 | Scott | 74/89.15 |
| 3,731,546 | 5/1973 | MacDonald | 74/424.8 R |

*Primary Examiner*—Leonard H. Gerin
*Attorney, Agent, or Firm*—Richards, Shefte & Pinckney

[57] ABSTRACT

A mechanical actuator having a housing in which a gear-nut assembly is rotatably mounted on bearings to be driven by a drive shaft extending into the housing through a sealed aperture. The gear-nut assembly includes a gear component engaging the drive shaft, a ball nut component carrying a plurality of ball members arranged in driving engagement with a screw member extending through the interior of the gear-nut assembly, and a tubular shield member mounted in covering relation about the ball nut component and sealed at the ends thereof to cover ball return tubes on the surface of the ball nut component. Annular seals are provided at each end of the gear-nut assembly to extend in sealing relation between the exterior surface thereof and the housing to thereby form a sealed cavity about the drive for the gear-nut member assembly and, preferably, the bearings thereof, and this sealed cavity is filled with lubricating oil which serves to lubricate the moving parts therein and to assist in dissipating heat generated by such moving parts.

8 Claims, 3 Drawing Figures

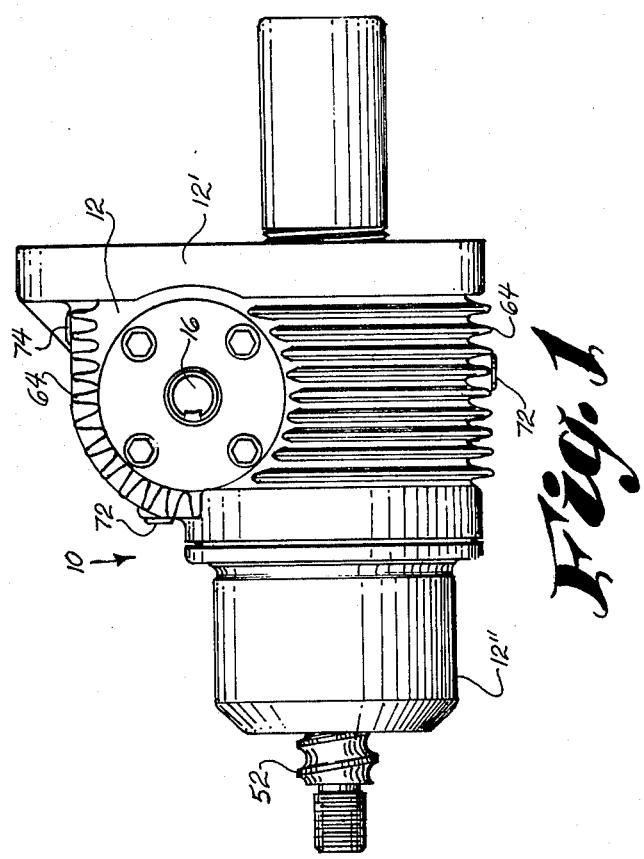
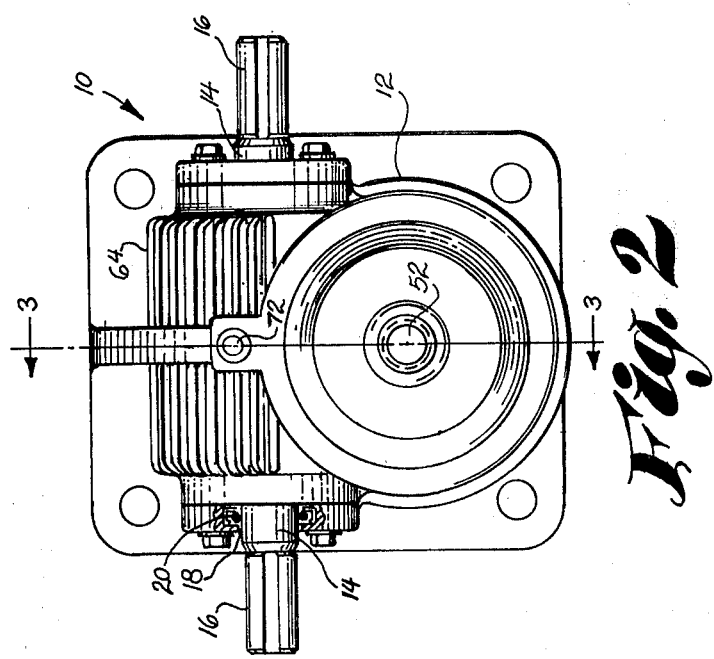

MECHANICAL ACTUATOR

BACKGROUND OF THE INVENTION

The present invention relates to nut-and-screw mechanical actuators, or jack mechanisms, of the type disclosed in U.S. Pat. No. 3,485,110, issued Dec. 23, 1969, and U.S. Pat. No. 3,178,958, issued Apr. 20, 1965, which includes a housing having a ball nut component rotatably mounted therein and driven by an input worm shaft which extends into the housing and engages a worm gear associated with the ball nut component. The ball nut component is formed with a helical cavity and exteriorly mounted ball return tubes in which a plurality of balls are circulated in a constant driving engagement with the helical grooves of a screw member extending through the ball nut component.

When the actuator is operated at high speeds and under relatively high torque loads, wear becomes a significant problem and there is also a problem of heat generation at the meshing gear drive, which conditions require a substantial amount of lubrication. Moreover, because of practical construction considerations, the ball nut component includes a plurality of individual elements which are assembled as a unitary structure, and this unitary structure includes a number of joints and the like which are not fully sealed, whereby it has heretofore been impractical to expose the exterior surface of the ball nut component, and the aforementioned meshing gear drive therefor, to a lubricating oil because such oil would leak through the ball nut component to the screw member and ultimately be lost.

Accordingly, it is now common practice to substantially fill the housing area surrounding the ball nut component with a heavy grease (e.g. Ep-2 grade grease). This grease acts, of course, as a lubricant between the moving gear drive parts, and, because of its high viscosity, there is no significant leakage of the grease through the ball nut component. However, grease has several disadvantages. First, at very high speeds of the input drive shaft, the heat build up is sufficient to break down the grease whereby wear will occur between the gear drive parts, and, as a result, the mechanical actuator cannot be run at high speeds for any significant period of time. Additionally, the viscosity of the grease reduces substantially the ability of the grease to circulate freely among the moving parts and throughout the housing interior, and, consequently, the lubricating capacity of the grease is impaired and the overall thermal efficiency of the mechanical actuator is reduced by the inability of the grease to transfer heat from the gear drive parts to the housing wall for dissipation.

It has also been heretofore proposed in U.S. Pat. No. 3,858,458, issued Jan. 7, 1975, to form the housing interior of a ball nut-and-screw actuator with an oil compartment provided with a vertically extending dam or barrier and an overflow passageway in such dam, all of which retains the oil at a level in the housing which is isolated, by gravity, from the ball nut and screw arrangement. However, the oil compartment is not sealed, and the actuator must be maintained at a substantially vertical disposition at all times to prevent oil leakage through the ball nut and screw arrangement. Furthermore, the height of the actuator must be extended appreciably and undesirably to accommodate the dam or barrier.

In accordance with the present invention, a mechanical acutator is provided which includes a unique gear-nut assembly and housing arrangement that permits lubricating oil to be used both to lubricate the moving parts of the gear-nut assembly and to dissipate heat from such moving parts, regardless of the particular disposition of the actuator during use.

SUMMARY OF THE INVENTION

The mechanical actuator of the present invention includes a housing formed with an interior opening therein, and a drive shaft extends into such opening through a sealed aperture in the housing. A gear-nut assembly is rotatably mounted in the interior opening of the housing, and includes a gear component arranged to mesh with the drive shaft in driven engagement therewith. The gear-nut assembly also includes a modified conventional ball nut component having exteriorly exposed ball return means containing ball members engaging in helical threads of a screw member extending therethrough, and a tubular shield member having an end adjacent the gear component sealingly secured to the gear-nut assembly. Sealing means extend from the housing to the exterior surface of the gear-nut assembly at locations on both sides of its gear component to form thereby a sealed cavity between the housing and the exterior surface of the gear-nut assembly, such sealed cavity being filled with a lubricating fluid which freely circulates among the moving parts contained within the cavity to lubricate the same and transfer heat generated thereby to the housing wall for dissipation thereat.

Preferably, the gear-nut assembly includes a bearing retainer element fixed at the other end of the ball nut component with the shield member mounted between the bearing retainer element and the gear component in sealed relation therewith, and both the bearing retainer element and the gear component are formed with axially extending bearing support portions at which tapered bearings are mounted to rotatably support the gear-nut assembly within the housing. The aforesaid sealing means engage both of the aforesaid bearing support portions at locations axially outward of the tapered bearings so that such bearings are located within the sealed, oil-filled cavity.

Finally, the mechanical actuator housing may be provided with a plurality of passages extending therethrough to the aforesaid cavity, each such passage having selectively removable plugging elements mounted therein, and extending at a different angular relationship with respect to the axis of the mechanical actuator screw member, whereby at all normal operating positions of the actuator at least one passage will be extending vertically upward and can be fitted with a plug that is pervious to air to permit some "breathing" within the sealed cavity.

BRIEF DESCRIPTION OF THE DRAWINGS

FIG. 1 is a side elevational view of the mechanical actuator of the present invention;

FIG. 2 is a front elevational view of the mechanical actuator illustrated in FIG. 1.

DESCRIPTION OF THE PREFERRED EMBODIMENT

Figure 3:
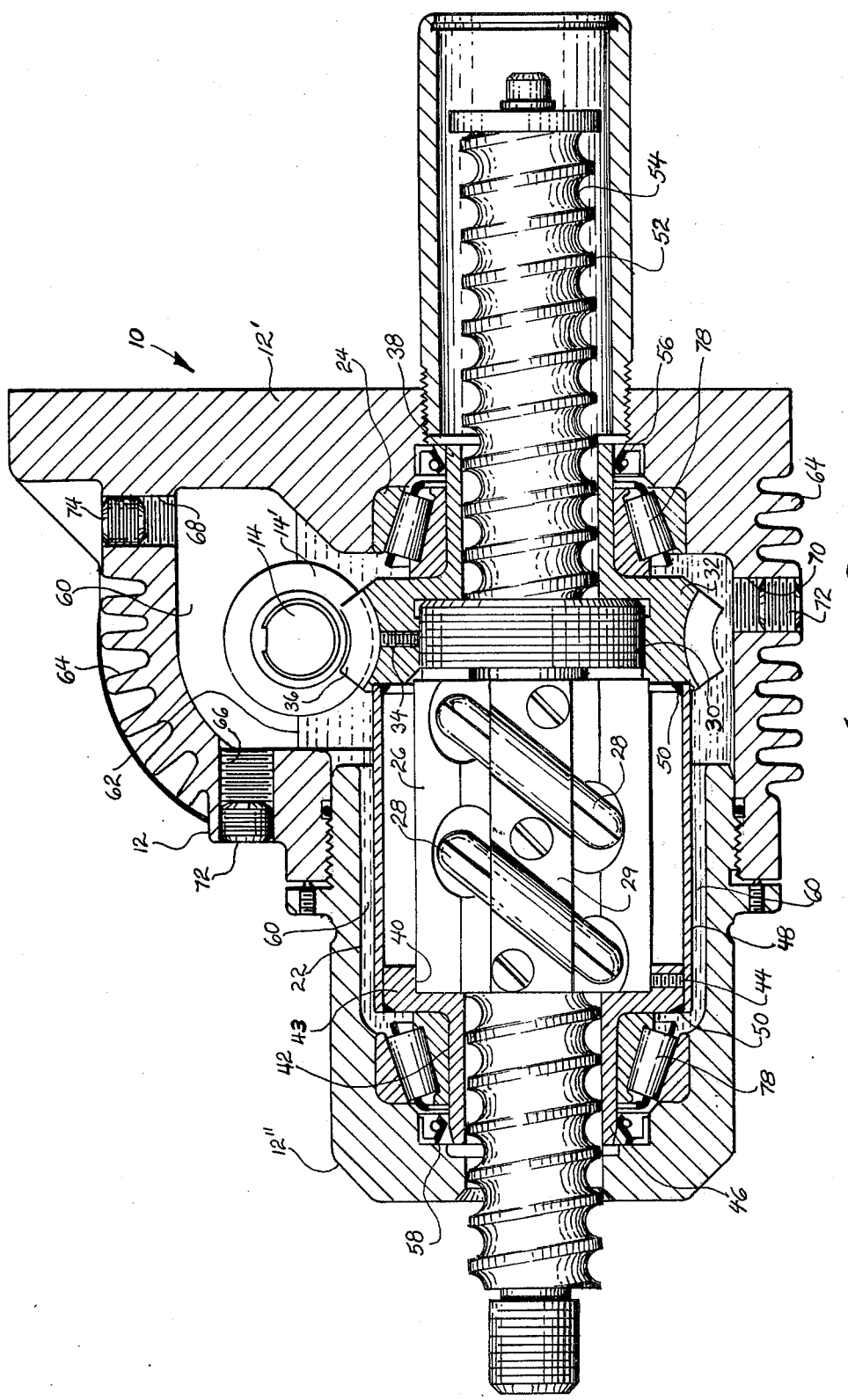
FIG. 3 is a sectional view taken along line 3—3 in FIG. 2.

Looking now in greater detail at the accompanying drawings, FIGS. 1–3 illustrate a mechanical actuator 10 having a housing 12 formed as a shell 12' and a shell cap 12" threaded thereinto, and formed with an interior opening therein. A drive shaft 14 extends through the housing 12, and includes a worm screw portion 14' disposed within the housing interior opening and two end portions 16 which extend beyond the housing 12 at two sides thereof for connection to a suitable drive source, such as a conventional electric motor (not shown), at either side of the housing 12. Each of the end portions 16 of the shaft 14 extends through an aperture 18 in the housing 12, and an annular seal member 20 is mounted in such aperture to engage the shaft 14 and thereby seal the interior of the housing 12 as will be explained in greater detail below. Only aperture 18 and seal member 20 are illustrated in section at the left-hand side of the actuator 10 in FIG. 2, but it is to be understood that an identical aperture and seal arrangement is also provided for the shaft 14 at the right-hand side of the actuator 10.

A gear-nut assembly 22 is rotatably supported within the interior opening of the housing 12 by annular bearing assemblies 24 mounted in the housing 12 adjacent each end of the gear-nut assembly 22 as best seen in FIG. 3. The gear-nut assembly 22 includes a modified conventional ball nut component 26 of the same type as that described in greater detail in aforementioned U.S. Pat. No. 3,485,110, such ball nut component 26 being formed with exteriorly exposed return tubes 28, secured to the nut component 26 by a metal strap 29, for connecting spaced portions of a helical cavity (not shown) in which a plurality of ball elements (not shown) are confined. One end of the ball nut component 26 is threaded in a recess 30 of a gear component 32 and secured thereat by one or more set screws 34, the end face of the ball nut component and the mating face of the recess 30 being machined flat and perpendicular to the axis of the ball nut component 26 to assure an accurate alignment of the ball nut component 26 with the gear component 32. The gear component 32 includes an annular gear face 36 disposed at the exterior surface of the gear-nut assembly 22 in driven engagement with the worm screw portion 14' of the drive shaft 14, and is formed with an axially extending bearing support portion 38 carried in one of the annular bearings 24. The other end of the ball nut component 26 is likewise mounted in a recess 40 formed in a bearing retainer 42, and held in place thereat by set screws 44, with the respective mating faces thereof being machined flat and perpendicular to the axis of the ball nut component 26.

The bearing retainer 42 includes a radially extending support portion 43 which extends beyond the radial extend of the ball return tube 28 and which is telescopically received within one end of the tubular shield member 48, the other end of the tubular shield member 48 being fixed to the gear component 32. A silicone adhesive sealant 50 is applied around the entire periphery of the ends of the shield member 48 to seal such ends to the support portion 43 and the gear component 32, respectively. The bearing retainer 42 also includes an axially extending bearing support portion 46 that is carried in the other annular bearing 24, and that provides a smooth cylindrical surface for engagement with an annular lip seal element 56 as will be explained in greater detail presently.

It will be noted that, by virtue of the above-described construction, a conventional ball nut component 26 having exposed ball return tubes 28 is arranged in a totally sealed environment within the shield member 48, and that the entire gear-nut assembly 22 is formed as a tightly fitted integral structure which is extremely stable as it rotates within the spaced annular bearings 78 whereby there is no significant wobble of the gear-nut assembly 22.

A conventional screw member 52 having a helical groove 54 formed therein extends through the interior of the ball nut component 26 in driven engagement with the ball elements therein whereby rotation of the ball nut component 26 will cause axial movement of the screw member 52, all as explained in greater detail in the aforementioned U.S. Pat. No. 3,485,110.

A conventional annular, spring-loaded, lip seal element 56 is mounted in the housing 12 to extend in sealing relation between the housing 12 and the smooth exterior surface of the bearing support portion 38, and a similar annular lip seal element 58 likewise extends between the housing 12 and the smooth exterior surface of the bearing support portion 46. It is to be noted that the annular lip seal elements 56 and 58 are located on both sides of the annular worm gear face 36 and the worm screw portion 14' engaged thereby, and that the exterior surface of the gear-nut assembly 22 is fully sealed along its entire axial extent between the annular lip seal elements 56 and 58. Accordingly, these annular lip seal elements 56 and 58 combine with the tubular shield member 48 to form a sealed cavity 60 between the housing 12 and the exterior surface of the nut member assembly 22. Within this sealed cavity 60 are located the driving engagement between the worm screw portion 14' and the gear face 36, as well as both of the annular bearings 24. It will also be noted that the previously described stability of the gear-nut assembly 22 during rotation thereof assures that the lip seals 56 and 58 will remain in constant sealing contact with the axially extending bearing support portions 38 and 46 respectively, to protect the sealed integrity of the cavity 60.

The sealed cavity 60 is filled, or substantially filled, with a lubricating oil 62 that is particularly suitable for lubricating gears, such as compounded oil having a grade designtion of AGMA 7, 8 or 8A (American Gear Manufacturers Association), and this oil 62 will remain in the sealed cavity to lubricate the engaged worm screw portion 14' and the worm gear face 36 as well as the bearings 24. Since the ball nut component 26, which would normally permit oil to leak through the return tube 28 to the screw member 52 and then out of the mechanical actuator 10 as discussed above, is sealed within the gear-nut assembly 22 and the tubular shield member 48 thereof, there is no significant leakage of oil either through the gear-nut assembly 22, or beyond the ends thereof because of the lip seals 56 and 58. Also, as described above, there can be no leakage of lubricating oil 62 from the sealed cavity 60 along the drive shaft 14 because of the seals 20 located in the housing apertures 18.

In addition to its lubricating function, the oil 62 also assists substantially in dissipating the heat generated by the driving engagement at the gear face 36. The oil 62 circulates freely throughout the sealed cavity 60, and in the process, it picks up heat at the gear face 36, at the worm screw portion 14', and at the bearings 24, and transfers this heat by circulation to the walls of the housing 12 where it is dissipated in the surrounding atmosphere. To assist in this dissipation, the walls of the housing 12 which surround the sealed cavity 60 are formed with a plurality of exterior fins 64 which increase the surface area at which heat received from the oil 62 can be dissipated.

In accordance with a further feature of the present invention, the housing 12 is provided with a plurality of passages 66, 68 and 70 which extend therethrough to the sealed cavity 60, each such passage being fitted with a solid plugging element 72 or a "breather" plug 74 threadably received therein to prevent oil from flowing through the passage. As seen in FIG. 3, each of the passages 66, 68 and 70 extends along an axis extending at a different angular relationship with respect to the axis of the screw member 52. More specifically, the passage 66 extends in a direction parllel to the axis of the screw member 52, the passage 68 extends perpendicularly and upwardly from the screw member axis, and the passage 70 extends perpendicularly and downwardly from the screw member axis, as seen in FIG. 3. By virtue of this arrangement, one of these passages will be located at or near the top of the sealed cavity 60 at the most common dispositions of the mechanical actuator 10. Thus, when the actuator 10 is disposed as shown in FIG. 3, the passage 68 is located at the top of the sealed cavity 62, and the normally solid plugging element therefor may be removed and replaced with a conventional threaded breather vent plug 74 that opens along the axis thereof and is filled with small metal pellets (not shown) which permit air to pass therethrough to equalize air pressure in the housing with the atmosphere, while restricting significant escape of oil 62. By permitting the free passage of air therethrough, this breather element 74 will permit the air column in the sealed cavity 60 to expand and contract as the temperature of the air and oil 62 vary during operation of the actuator 10. At other dispositions of the actuator 10 (e.g. with the axis of the screw member 52 extending vertically), another passage will be located at or near the top of the sealed cavity 60, and this passage will be the one having the breather vent plut 74 therein. A typical example of a conventional breather vent plug that may be used is Model No. BVPBIB 444866 marked by Pipe Fittings, Inc., Wellington, Ohio.

Finally, it is to be noted that the bearings 24 include a plurality of tapered bearing elements 78 disposed in an annular arrangement with each of the bearing elements 78 being rotatable about an axis extending generally toward the adjacent end of the screw member 52 at an acute angle with respect to the axis thereof. With this arrangement, the bearings 24 will not only serve as thrust bearings for the screw member 52 and gear-nut assembly 22, they will also serve to counteract side loading on such elements which could otherwise cause the gear-nut assembly to wobble and thereby possibly break the seal at the annular lip seals 56 and 58.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A mechanical actuator comprising:
   a. a housing,
   b. a drive shaft extending into said housing through an aperture therein and being rotatably disposed therein with gear means fixed thereon,
   c. a gear-nut assembly rotatably mounted in said housing and including:
      i. a gear component in driven engagement with said drive shaft gear means;
      ii. a ball nut component fixed for rotation at one end thereof with said gear component, said ball nut component having ball return means exposed exteriorly thereon; and
      iii. a tubular shield member mounted on said ball nut component in covering relation to said ball return means and defining with said housing a space therebetween, said shield member having an end adjacent said gear component sealingly secured to said gear-nut assembly,
   d. a screw member extending through said housing and gear-nut assembly in driven engagement with said ball nut component,
   e. sealing means disposed at said drive shaft aperture and between said gear-nut assembly and said housing, said sealing means in combination with said tubular shield member cooperating to seal oil within the space between said shield member and said housing including the space in which said drive shaft gear means and said gear-nut assembly are disposed and to seal oil from said ball return means and screw member, and
   f. oil contained in said sealed space to lubricate said gear means and gear-nut assembly and dissipate heat therefrom to said housing.

2. A mechanical actuator as defined in claim 1 and further characterized in that said gear-nut assembly includes a bearing retainer element fixed to the other end of said ball nut component, said bearing retainer element including a radially extending support portion to which said ball nut component is fixed and an axially extending support portion extending from said ball nut component.

3. A mechanical actuator as defined in claim 2 and further characterized in that said radially extending support portion of said bearing retainer element extends beyond the radial extent of said ball return means and sealingly supports said tubular shield member radially outwardly of said ball return means.

4. A mechanical actuator as defined in claim 2 and further characterized in that said gear component includes an axially extending bearing support portion, and in that said rotatable mounting for said gear-nut assembly includes tapered roller bearings located between said housing and the bearing support portions of said bearing retainer elements and said gear component, respectively.

5. A mechanical actuator as defined in claim 4 and further characterized in that said seal means extends from said housing to engage said bearing support portions of said bearing retainer element and said gear component at locations axially outward of said tapered roller bearing elements.

6. A mechanical actuator as defined in claim 1 and further characterized in that said housing is provided with a lubricating oil fill passage extending therethrough to said sealed cavity, and a removable plugging element disposed therein that is pervious to air.

7. A mechanical actuator as defined in claim 6 and characterized further by a plurality of said lubricating oil fill passages disposed at different locations about the periphery of said housing for generally upward disposition of at least one of said passages in selected operating positions of said actuator, said air pervious plugging element being disposed in at least one of said passages, and sealing plugging elements being seated in the other of said passages.

8. A mechanical actuator as defined in claim 1 and further characterized in that said ball return means projects outwardly from the exterior surface of said ball nut component.

* * * * *